United States Patent [19]

Fujii

[11] 4,145,239
[45] Mar. 20, 1979

[54] METHOD AND APPARATUS FOR PRODUCTION OF LAMINATED AND SHAPED WALL COVERING BOARD OF CORRUGATED PAPERBOARD BASE

[75] Inventor: Toshihiko Fujii, Yokohama, Japan

[73] Assignee: Nissan Motor Company, Limited, Yokohama, Japan

[21] Appl. No.: 817,493

[22] Filed: Jul. 20, 1977

[30] Foreign Application Priority Data

Jul. 21, 1976 [JP] Japan .................................. 51-87068

[51] Int. Cl.$^2$ .............................................. B29C 3/04
[52] U.S. Cl. ................................... 156/212; 156/214; 156/224; 156/229; 156/468; 156/475; 156/269; 156/494; 156/517; 156/556; 226/158; 156/569
[58] Field of Search ............... 156/212, 214, 210, 221, 156/224, 196, 198, 207, 219, 220, 229, 459, 468, 469, 470, 471, 475, 495, 496, 494, 269, 270; 271/91, 85, 84; 144/281 A; 226/158, 162, 164, 165, 166; 214/1.1, 1.7

[56] References Cited

U.S. PATENT DOCUMENTS

| | | | |
|---|---|---|---|
| 3,054,714 | 9/1962 | Johnston | 156/212 |
| 3,205,123 | 9/1965 | Hornbostel, Jr. | 156/287 |
| 3,507,730 | 4/1970 | Gambill et al. | 156/214 |
| 3,616,013 | 10/1971 | Bocchi | 156/224 |
| 3,937,379 | 2/1976 | Narwicl et al. | 226/162 |
| 3,964,953 | 6/1976 | Mitchard | 271/91 |
| 4,093,482 | 6/1978 | Ogata et al. | 156/196 X |

*Primary Examiner*—John T. Goolkasian
*Assistant Examiner*—William H. Thrower

[57] ABSTRACT

In the production of a wall covering board which is shaped and composed of a substrate of corrugated paperboard and a decorative and/or protective skin layer, a hot-press for bonding of the skin to the substrate either simultaneously with or subsequently to shaping of the substrate is combined with a skin material support mechanism and a drag mechanism including a sheet-grasping device mounted on the piston rod of a piston actuator. The support mechanism supports, with friction force, a belt of a sheet material employed as the skin at its one end horizontally on one side of the press. The piston rod is horizontally extended from the opposite side of the press to traverse the press and allow the grasping device to grasp the supported end of the belt and then retreated until the grasping device returns to the opposite side of the press, so that the belt is stretched between the stationary and movable dies of the press. By applying heat and pressure to the stretched belt through the movable die, the belt, i.e. the skin, is bonded to the substrate on the stationary die without acquiring wrinkles.

18 Claims, 3 Drawing Figures

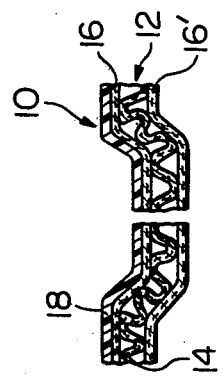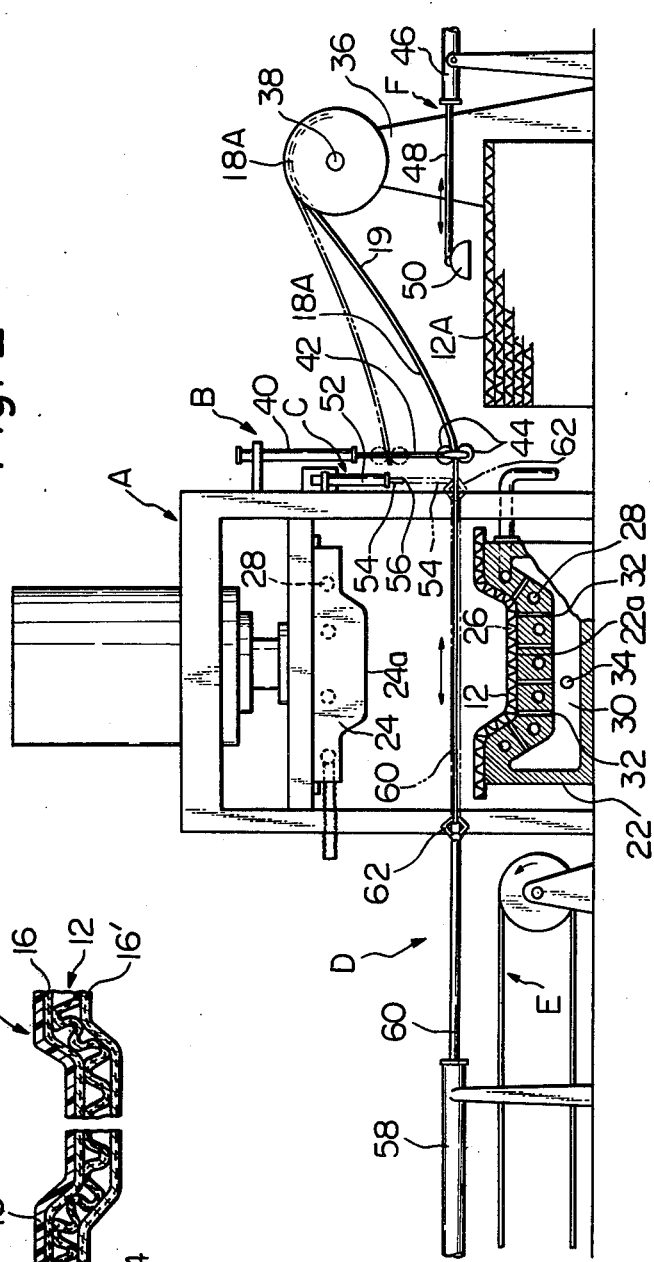

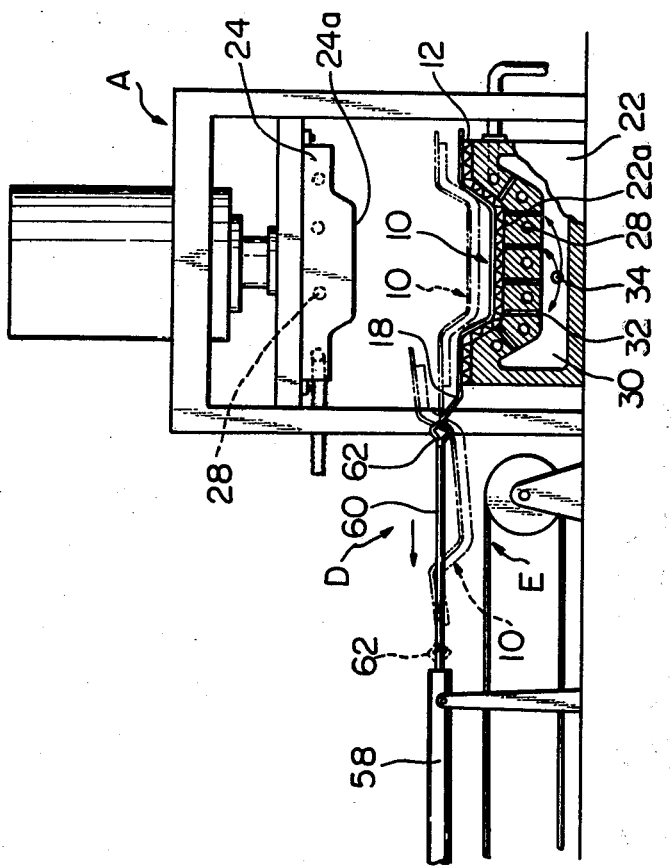

METHOD AND APPARATUS FOR PRODUCTION OF LAMINATED AND SHAPED WALL COVERING BOARD OF CORRUGATED PAPERBOARD BASE

BACKGROUND OF THE INVENTION

This invention relates to a method and apparatus for the production of a wall covering material for room interior uses, which material takes the form of a shaped board and is composed of a substrate of corrugated paperboard and a skin intimately laid on one side of the substrate. The invention is particularly concerned with a technique of neatly and efficiently laying the skin on the substrate.

In the field of wall covering board materials to afford comforts and/or decorative effect to the interior of cars, ships or buildings, corrugated paperboard has recently attracted industrial attention as a basic material because of its cheapness and lightness compared with prevailing materials such as resin-impregnated felt. In many cases, particularly for use in the interior of cars, a wall covering board of corrugated paperboard base needs to be shaped at production stage so as to be readily applicable to a curved wall or ceiling of, for example, an automobile passenger compartment. Furthermore, one side of the corrugated paperboard must be laid with a facing layer or skin which has decorative, protective and/or cushioning effects.

A wall covering board of the described type is usually produced by a two-stage process: firstly a flat board of corrugated paperboard employed as the substrate is press-formed into an intended shape (with application of heat when a thermoplastic resin is used in the corrugated paperboard as the adhesive for bonding the liners to the corrugated medium), and then a sheet material employed as the skin is laid on the shaped substrate with the interposal of an adhesive layer (unless the sheet material itself is of a hot-melt type) and bonded to the substrate by means of a hot-press. However, it is also possible to accomplish the application of the skin to the substrate simultaneously with the shaping of the substrate by placing the skin (and a hot-melt sheet) on a flat board of corrugated paperboard and shaping the piled materials as a whole by means of a hot-press.

The material of the skin is selected from a variety of sheet materials such as woven and nonwoven cloths of natural or synthetic fibers, artificial leathers, soft plastics sheets including laminated sheets given by laying, for example, a urethane foam layer with a polyvinyl chloride sheet. A typical example of hot-melt adhesives useful for bonding the skin to the corrugated paperboard substrate is polyethylene.

The production of corrugated paperboard base wall covering boards by either the two-stage method or the single-stage method has encountered a problem that both the substrate and the skin are liable to wrinkle when the aim of the press-forming is a complicated shaping, particularly when the corrugated paperboard substrate (and hence the skin too) is bulged or dented with relatively small radii of curvature without respect to the direction of the corrugation. Wrinkling of the skin is most undesirable since the skin is required to have a good appearance. To prevent wrinkling of the skin, there is a need of horizontally stretching the skin in a space between male and female dies for press-forming and maintaining the stretched skin in a laterally (horizontally) tensioned state while pressure is applied to the skin. In conventional production methods, such stretching and tensioning of the skin are performed manually: two or more workers standing aside the press grasp the skin at its border regions and respectively give a pull at the skin to keep it in a stretched and tensioned state until the completion of the bonding to the substrate. There is a somewhat improved method wherein certain clamp mechanisms are arranged aside the hot-press to support the skin in a stretched state. Even in this method, there is a need of manually spreading the skin between the dies and setting the spreaded skin on the clamp mechanisms. Naturally the laminating operation suffers from low efficiency and heavy labor costs.

As an additional factor affecting the efficiency of the above described operation, it should not be overlooked that the withdrawal of a shaped board, which is usually a considerably wide board, from the female die is performed always manually.

It is an object of the present invention to provide an improved method of producing a shaped wall covering board composed of a corrugated paperboard substrate and a skin intimately laid on one side of the substrate, which method brings about improved efficiency and reduced labor costs in the production and is effective for preventing wrinkling of the skin during shaping and laminating.

It is another object of the invention to provide an improved method of producing a wall covering board of the described type, which method allows the procedures for the application of the skin to the substrate and withdrawal of the shaped product from a shaping die to be automated and performed continuously.

It is a still another object of the invention to provide a molding and laminating apparatus for efficiently producing a high quality wall covering board of the described type, which apparatus includes a mechanism for stretching and tensioning a sheet material serving as the skin of the product.

According to the invention, a method of producing a shaped wall covering board which is composed of a substrate of corrugated paperboard and a skin layer intimately laid on one side of the substrate for decorative, cushioning and/or protective effects comprises the following steps: (a) placing the substrate on a stationary die of a hot-press which has also a movable die, (b) supporting a belt of a sheet material employed as the skin at its one end with friction force such that the supported end is positioned on one side of the stationary die substantially in a plane which interposes between the stationary and movable dies in the parted state and is approximately normal to the direction of the movement of the movable die, (c) extending an arm having a sheet-grasping mechanism at its one end substantially in the aforementioned plane from the opposite side of the stationary die to grasp the supported end of the belt by the grasping mechanism, (d) providing a layer of an adhesive material which is operative at an elevated temperature between the belt and the substrate placed on the stationary die prior to the step (c) unless the sheet material has an adhesive property at an elevated temperature, (e) retreating the arm until the grasped end of the belt reaches the opposite side of the stationary die, so that the belt is stretched between the movable die and the substrate placed on the stationary die, (f) applying heat and pressure to the stretched belt through the movable die to bond the stretched belt, i.e., the skin layer, to the substrate on the stationary die, (g) severing the belt on the firstly mentioned side of the stationary die after the step (f), and (h) further retreating the arm with continued grasping of the skin layer bonded to the substrate to withdraw the product of the step (f) from the stationary die.

When the substrate at the step (a) is in the state of a flat board, the substrate and the skin are simultaneously shaped at the step (f). When the substrate alone is shaped prior to the step (a), the skin is shaped at the step (f) in conformance with the shape of the substrate.

The step (d) is accomplished conveniently by preliminarily laying one side of the sheet material with the adhesive material.

Apparatus according to the invention for the production of the described wall covering board comprises a hot-press having a stationary die and a movable die, a skin material support mechanism for supporting a belt of a sheet material employed as the skin layer at its one end with friction force on one side of the stationary die, a drag mechanism for grasping the belt at the supported end and dragging the grasped belt into the hot-press to stretch the belt between the stationary and movable dies while the movable die is parted from the stationary die, and a cutter mechanism for severing the belt on the aforementioned side of the stationary die when the stretched belt, i.e., the skin layer, is bonded to the substrate in the hot-press to give the wall covering board. The skin material support mechanism supports the belt such that the supported end of the belt is substantially in a plane interposing between the stationary and movable dies, which are in the parted state, approximately normal to the direction of the movement of the movable die. The drag mechanism includes an actuator which is held on the opposite side of the stationary die and has an arm selectively extendable and retreatable substantially in the aforementioned plane and a sheet-grasping device mounted on one end of the arm, and the actuator is arranged and operative such that the sheet-grasping device can travel over the entire width of the stationary die to grasp the supported end of the belt when the arm is fully extended and can take a definite position on the opposite side of the stationary die, with continued grasping of the belt, when the arm is retreated. The arm can be further retreated from the aforementioned position with continued grasping of the skin layer bonded to the substrate such that the wall covering board is withdrawn from the stationary die.

Preferably, the stationary die is hollowd and bored so that air may be blown at the substrate of the product to aid parting of the product from the die.

Pinch rolls would be utilized in the belt support mechanism, and a piston actuator may be used for keeping the pinch rolls in the intended position while the grasping mechanism is in operation and changing the position of the rolls when the substrate is being introduced into the hot-press.

BRIEF DESCRIPTION OF THE DRAWINGS

FIG. 1 is a sectional view of a wall covering board produced by a method according to the invention, showing a laminated structure of the board;

FIG. 2 is an elevational view, partly in section, of a molding and laminating apparatus according to the invention for producing the board of FIG. 1; and FIG. 3 shows a product release action of the same apparatus in the same view.

DESCRIPTION OF PREFERRED EMBODIMENTS

FIG. 1 shows the construction of a wall covering board 10 to be produced by a method according to the invention. The illustrated shape of the board 10 should be taken as merely by way of example. Corrugated paperboard 12, usually a double-faced board but sometimes a single-faced board, is used as the basic material or substrate of this wall covering board 10. For this corrugated paperboard 12, a thermoplastic resin such as polyethylene is preferably used as the adhesive for joining liners 16 and 16' to corrugated medium 14. The wall covering board 10 has a facing layer or skin 18 intimately laid on one (16) of the liners 16, 16' for decorative, cushioning and/or protective effects. A variety of materials are of use as the skin 18 as described hereinbefore. The skin 18 is bonded to the substrate 12 in most cases by means of a hot-melt type adhesive such as polyethylene. When, however, the skin 18 is of a thermoplastic resin, the bonding can be accomplished by sufficiently softening the skin 18 by application of heat, using no extra adhesive.

Referring to FIG. 2, a molding and laminating apparatus according to the invention is a combination of a hot-press A and a sheet stretching mechanism which includes a sheet support mechanism B, a cutter mechanism C and a drag mechanism D. A conveyer system such as a belt conveyer E is supplemented to this apparatus for the conveyance of the product. Optionally, this apparatus may be provided with a substrate feed mechanism F.

The hot-press A has a stationary die 22 in a lower position and a vertically movable die 24 in a cooperative arrangement. The upper face 22a of the stationary die 22 and the lower face 24a of the movable die 24 are shaped in accordance with the intended shape of the wall covering board 10. Conveniently, the stationary die 22 is made to be a female die and the movable die 24 a male die. The dies 22 and 24 are designed such that a clearance 26 corresponding to the shape and thickness of the product 10 is established between the shaped regions of the die faces 22a and 24a when the movable die 24 is lowered to engage with the stationary die 22. Both the stationary and movable dies 22 and 24 are provided with heating pipes 28 through which is passed a heated fluid from an external heat source (not shown). The stationary die 22 is made hollow so as to define therein a space 30 below the heater pipe 28, and a plurality of holes 32 of small cross-sectional areas are formed in this die 22 to extend from the shaped face 22a to this space 30. A duct 34 connectes the space 30 to an external air blower (not shown).

A support 36 stands at a certain distance from the hot-press A to hold a horizontal shaft 38 at a height somewhat above the plane of the die face 22a. A sheet material as the material of the skin 18 takes the form of a rolled belt 18A mounted on the shaft 38. In the illustrated case, the lower side (inside in the rolled state) of the sheet material 18A is laid with a hot-melt sheet 19 (of polyethylene, for example). The sheet support mechanism B is located on the same side of the hot-press A as the shaft 38 does (on the right side in FIG. 2). As an element of this mechanism B, a pneumatic or hydraulic actuator 40 is attached to a right side frame of the hot-press A such that its piston rod 42 can extend vertically downwards and retreat upwards with a short distance from the frame of the hot-press A. A pair of rolls 44, which are in the style of pinch rolls, are mounted on the free end of this piston rod 42 and can pass the free end of the rolled belt 18A therebetween with the exertion of a friction force. The actuator 40 is positioned such that the rolls 44 pinch the belt 18A nearly at its border. Another actuator, which is identical with the described and illustrated actuator 40 including the rolls 44, is mounted on the frame of the hot-press A at the same height as the described actuator 40 such that the two actuators 40 are in a vertical plane which is parallel to the shaft 38 and stand at a distance near the width of the belt 18A. (As a result, only one of these two actuators 40 can be seen in FIG. 2) Accordingly the rolls 44 of the second or invisible actuator 40 pinch the belt 18A nearly at the other border so that the free end of the belt 18A protrudes nearly horizontally from the two pairs of rolls 44 towards the hot-press A. The holding of the belt 18A in such a manner can alternatively be acomplished by the use of only one actuator (40) which is appropriately positioned and holds a pair of sufficiently long cylindrical rolls (44).

In the illustrated case, flat boards 12A of corrugated paperboard, which are already cut into a suitable plan view geometry each to serve as the substrate 12 of the wall covering board 10, are stacked on the right side of the hot-press A. The optional substrate feed mechanism F has a pneumatic or hydraulic actuator 46, which has a fairly long and horizontally extendable piston rod 48, and a vacuum cup 50 is attached to the free end of the piston rod 48. The vacuum cup 50 is directed downward so as to suck up the uppermost one of the stacked boards 12A when suction is effected. The actuator 46 can extend its piston rod 48 to such an extent that the sucked board 12A can be transferred to the stationary die 22.

The cutter mechanism C includes a traverser (omitted from the illustration) which carries a vertically oriented pneumatic or hydraulic cylinder 52. The action of the traverser causes the cylinder 52 to move parallel to and axially of the shaft 38 within a vertical plane interposing between the actuators 40 and the right side frame of the hot-press A over the entire width of the belt 18A. This cylinder 52 has a downwardly extendable piston rod 54 with a cutter blade 56 attached to its free end.

The drag mechanism D has a pneumatic or hydraulic actuator 58 arranged horizontally and located on the opposite side (left side in FIG. 2) of the hot-press A with respect to the sheet support mechanism B. A piston rod 60 of this actuator 58 has sheet-grasping means such as a pair of jaws 62 at its free end. In plan view, the jaws 62 have approximately the same width as the belt 18A and lie opposite and parallel to the free end of the belt 18A held by the rolls 44. The piston rod 60 can extend towards the hot-press A, keeping a small height above the upper end of the stationary die 22, such that the jaws 62 can travel over the entire width of the die 22. Besides, the actuator 58 can hold the piston rod 60 in a half-extended state such that the jaws 62 take a position close to the left side (a side nearest to the actuator 58) of the die 22. The piston rod 60 is liable to bend downwards due to its considerable length. Accordingly it is preferable to employ a piston actuator of a double cylinder type as the actuator 58. In this case, the jaws 62 are easily allowed to take either a fully fowarded position (on the right side of the hot-press A) or the aforementioned half-fowarded position by determining the strokes of the first and second stage piston cylinders respectively in accordance with the intended positions of the jaws 62.

The actuators 40 and the actuator 58 are designed and arranged such that the middle of the paired rolls 44 and the axis of the piston rod 60 are in the same horizontal plane when the rolls 44 take the lowered position.

As can be understood without particular explanation, the above described apparatus is provided with a control unit (not shown) for sequentially operating the hot-press A, the actuators 40, 46, 52, 60 and the jaws 62. The operation of the apparatus of FIG. 2 and the procedures of a production method according to the invention are as follows in the case of, by way of example, performing the shaping of the corrugated paperbord 12A and the application of the skin 18 to the shaped substrate 12 successively in the same hot-press A.

At the start of the operation the movable die 24 takes an upwardly retreated position with an ample distance from the stationary die 22, and all the actuators are in retreated state. At this state vacuum is applied to the vacuum cup 50 so as to catch the uppermost one of the stacked corrugated paperboard 12A. Then the actuator 46 is operated to extend its piston rod 48 till the vacuum cup 50 reaches just above the stationary die 22. The board 12A is placed on the stationary die 22 by interrupting the application of vacuum to the vacuum cup 50, and the piston rod 48 is retreated. These movements of the piston rod 48 (and the transfer of the board 12A) are not obstructed by the belt 18A since the actuators 40 keep the rools 44 and hence the free end of the belt 18A well above the path of the piston rod 48.

Next, the movable die 24 is lowered so as to press the flat board 18A against the shaped face 22a of the die 22. This press-forming operation is performed with application of heat when the corrugated paperboard 12A utilizes a thermoplastic resin as the adhesive.

The movable die 24 is retreated upwards upon completion of the press-forming and at the same time the actuators 40 of the sheet support mechanism C are operated so as to lower the rolls 44 as shown by solid line in FIG. 2. Then the actuator 58 of the drag mechanism D is operated so as to maximumly extend its piston rod 60, and the jaws 62 are put into action so as to grasp the free end of the belt 18A as shown by phantom line in FIG. 2. This can be done since the rolls 44 in the lowered position hold the free end of the belt 18A in a horizontal plane in which moves the piston rod 60. Then the piston rod 60 retreats to cause unrolling of the belt 18A until the jaws 62 reach the aforementioned position near the left side of the stationary die 22(as shown by solid line in FIG. 2). When the movement of the piston rod 60 stops to keep the jaws 62 in this position, the sheet material 18A is horizontally stretched within the hot-press A to lie slightly above the shaped substrate 12 with an appropriate tension attributed to the friction force of the rolls 44 and the drag exerted through the jaws 62.

In this state, the movable die 24 is again lowered in a heated state so as to press the sheet material 18A against the shaped substrate 12 which is retained in the heated stationary die 22. Consequently the hot-melt sheet 19 on the lower side of the sheet material 18A melts and causes good adhesion of the sheet material 18A to the shaped substrate 12 over the entire area. Since the rolls 44 and the jaws 62 continue to hold the sheet material 18A during this procedure, the sheet material 18A is subjected to heat and pressure in a tensioned state and hence can be formed in conformance with the shaped substrate 12 without acquiring wrinkles even in areas where the substrate 12 is bulged or dented with relatively small radii of curvature.

Then the actuator 52 is put into action to lower its piston rod 54 until the cutter blade 56 comes into contact with the tensioned belt 18A, followed by the operation of the traverser, resulting in the severance of the belt 18A. Thereafter the cutter blade 56, rolls 44 and the movable die 24 are retreated upwards. In this state the actuator 58 is again operated so as to completely retreat the piston rod 60. Since the jaws 62 still grasp the sheet material 18A, i.e. the skin 18, the complete retreat of the piston rod 60 results in that the shaped and laminated trim board 10 is pulled out of the stationary die 22 as illustrated by phantom line in FIG. 3. The conveyer E is arranged such that the product 10 rests on the conveyer F when taken out of the die 22. Then the jaws 62 are made to open to release the product 10.

It will be understood that the rolls 44 may always take a definite position (the position shown by solid line in FIG. 2), meaning the omission of the actuator 40, in the case when the corrugated paperboard 12A (or the shaped substrate 12) can be introduced into the hot-press A from, for example, the front side in FIG. 2.

Sometimes the product 10 cannot easily be parted from the die 22 by merely exerting a lateral drag on the skin 18 at its border on one side, particularly when the substrate 12 stickes fast to the die face 22a due to complicated shaping or great curving. In such a case, the withdrawal of the product 10 from the die 22 can be facilitated by blowing air at the lower surface of the shaped substrate 12 through the duct 34, space 30 and holes 32 so that the product 10 may be pushed upwards.

If it is intended to simultaneously accomplish the shaping of the corrugated paperboard 12A and the application of the skin 18 to the substrate 12 (meaning the production of the wall covering board 10 by a single procedure), the above described operation of the apparatus of FIG. 2 receives only a minor modification that the belt 18A is grasped by the jaws 62 and stretched above the stationary die 22 immediately after the setting of the flat board 12A on the die 22 in order to press-form the corrugated paperboard 12A with the interposal of the tensioned sheet material 18A between the board 12A and the movable die 24.

On the contrary, the forming of the corrugated paperboard 12A into the substrate 12 may be accomplished in advance as a procedure completely separate from the application of the skin 18 to the substrate 12. In any case the hot-melt sheet 19 may be prepared as an independent material instead of preliminarily applying to the sheet material 18A (and can be omitted when the sheet material 18A is of a hot-melt type).

According to the invention, as will have been understood from the foregoing description, the stretching of the sheet material 18A, application of the sheet 18A to the corrugated paperboard substrare 12 (or the board 12A) and even the withdrawal of the product 10 from the stationary die 22 can be completely automated. A method of the invention is advantageous over a conventional method in which the skin 18 is manually stretched and tensioned not only in greatly reduced labor costs but also in remarkably improved appearance of the product.

What is claimed is:

1. A method of producing a shaped wall covering board which is composed of a substrate of corrugated paperboard and a skin layer intimately laid on one side of the substrate for decorative, cushioning and/or protective effects, the method comprising the steps of:
   (a) placing the substrate on a stationary die of a hot-press which has also a movable die;
   (b) supporting a belt of a sheet material employed as the skin at one end thereof with friction force such that said one end is positioned on one side of said stationary die substantially in a plane which interposes between said stationary and movable dies in the parted state and is approximately normal to the direction of the movement of said movable die;
   (c) extending an arm having a sheet-grasping mechanism at one end thereof substantially in said plane from the opposite side of said stationary die to grasp said one end of said belt by said mechanism;
   (d) providing a layer of an adhesive material which is operative at an elevated temperature between said belt and the substrate placed on said stationary die prior to the step (c);
   (e) retreating said arm until said one end of said belt reaches said opposite side of said stationary die, whereby said belt is stretched above the substrate placed on said stationary die;
   (f) applying heat and pressure to the stretched belt through said movable die to bond the stretched belt as the skin layer to the substrate on said stationary die;
   (g) severing said belt on said one side of said stationary die after the step (f); and
   (h) further retreating said arm with continued grasping of the skin layer bonded to the sbustrate to withdraw the product of the step (f) from said stationary die.

2. A method as claimed in claim 1, wherein the step (h) includes an auxiliary step of blowing air at the substrate of said product through an aperture formed in said stationary die to aid parting of said product from said stationary die.

3. A method as claimed in claim 1, wherein the substrate at the step (a) is in the state of a flat board, so that the substrate and the skin layer are simultaneously shaped at the step (f).

4. A method as claimed in claim 1, wherein the substrate at the step (a) is in the state of a shaped board, so that the skin layer is shaped at the step (f) in conformance with the shape of the substrate.

5. A method as claimed in claim 1, wherein the step (d) is accomplished by laying one side of said sheet material with said adhesive material prior to the step (b).

6. A method as claimed in claim 1, wherein the step (d) is accomplished by interposing a hot-melt sheet between said belt and said substrate prior to step (c).

7. A method as claimed in claim 6, wherein said hot-melt sheet is applied to said sheet material prior to the step (b).

8. A method of producing a shaped wall covering board which is composed of a substrate of corrugated paperboard and a skin layer intimately laid on one side of the substrate for decorative, cushioning and/or protective effects, the method comprising the steps of:
   (a) placing the substrate on a stationary die of a hot-press which has also a movable die;
   (b) supporting a belt of a sheet material employed as the skin at one end thereof with friction force such that said one end is positioned on one side of said stationary die substantially in a plane which interposes between said stationary and movable dies in the parted state and is approximately normal to the direction of the movement of said movable die, said sheet material being a plastic material having an adhesive property at elevated temperatures;

(c) extending an arm having a sheet-grasping mechanism at one end thereof substantially in said plane from the opposite side of said stationary die to grasp said one end of said belt by said mechanism;

(d) retreating said arm until said one end of said belt reaches said opposite side of said stationary die, whereby said belt is stretched above the substrate placed on said stationary die;

(e) applying heat and pressure to the stretched belt through said movable die to bond the stretched belt as the skin layer to the substrate on said stationary die;

(f) severing said belt on said one side of said stationary die after the step (e); and (g) further retreating said arm with continued grasping of the skin layer bonded to the substrate to withdraw the product of the step (e) from said stationary die.

9. A method as claimed in claim 8, wherein the step (g) includes an auxiliary step of blowing air at the substrate of said product through an aperture formed in said stationary die to aid parting of said product from said stationary die.

10. A method as claimed in claim 8, wherein the substrate at the step (a) is in the state of a flat board, so that the substrate and the skin layer are simultaneously shaped at the step (e).

11. A method as claimed in claim 8, wherein the substrate at the step (a) is in the state of a shaped board, so that the skin layer is shaped at the step (e) in conformance with the shape of the substrate.

12. Apparatus for the production of a shaped wall covering board which is composed of a substrate of corrugated paperboard and a skin layer intimately laid on one side of the substrate, the apparatus comprising:

a hot-press having a stationary die and a movable die;

a skin material support means for supporting a belt of a sheet material employed as the skin layer at one end thereof with friction force such that said one end is positioned on one side of said stationary die substantially in a plane interposing between said stationary and movable dies in the parted state approximately normal to the direction of the movement of said movable die;

a drag means for grasping said belt at said one end and dragging the grasped belt into said hot-press to stretch said belt between said stationary die and said movable die; said drag means including a first actuator which is held on the opposite side of said stationary die and has an arm selectively extendable and retreatable substantially in said plane and a sheet-grasping device mounted on one end of said arm, said actuator being arranged and operative such that said sheet-grasping device can travel over the entire width of said stationary die to grasp said one end of said belt when said arm is fully extended and can take a definite position on said opposite side of said stationary die with continued grasping of said belt when said arm is retreated; and a cutter means for severing said belt on said one side of said stationary die when the stretched belt as the skin layer is bonded to the substrate in said hot-press to give the wall covering board;

said arm being further retreatable from said position with continued grasping of the skin layer bonded to the substrate such that the wall covering board is withdrawn from said stationary die.

13. Apparatus as claimed in claim 12, wherein said stationary die is hollowed to define a space therein and has a plurality of holes formed therein to connect said space to the shaped face of said stationary die, said hot-press being provided with an air blowing means for blowing air into said space to aid parting of the wall covering board from said stationary die.

14. Apparatus as claimed in claim 12, wherein said first actuator is a piston actuator of a double cylinder type, the stroke of the first stage piston cylinder of said actuator being adjusted so as to keep said sheet-grasping device in said position.

15. Apparatus as claimed in claim 12, wherein said skin material support means comprise a shaft held parallel to said plane for mounting a roll of said belt, and a pair of rolls which are arranged in the style of pinch rolls with the middle thereof in said plane so as to pass said belt therethrough with the exertion of a friction force.

16. Apparatus as claimed in claim 15, wherein said cutter means comprise a second actuator having a piston rod extendable and retreatable substantially perpendicularly to said plane, a cutter blade attached to the free end of said piston rod of said second actuator and means for moving said second actuator over the entire width of said belt within a plane which is substantially normal to the stretched belt and interposes between said rolls and said hot-press.

17. Apparatus as claimed in claim 15, wherein said skin material support means comprise a third actuator having a piston rod extendable and retreatable substantially perpendicularly to said plane, said pair of rolls being mounted on the free end of said piston rod of said third actuator such that said one end of said belt is kept in said plane when said piston rod of said third actuator is extended but is made more distant from said stationary die when said piston rod of said third actuator is retreated, whereby the introduction of the substrate into said hot-press is not obstructed by said belt.

18. Apparatus as claimed in claim 12, wherein said sheet-grasping device is a pair of jaws having substantially the same width as said belt.

* * * * *